July 31, 1962 W. E. DOBBINS 3,047,229
APPARATUS FOR CONVERSION OF DEGREES TO MINUTES
Filed Nov. 21, 1958
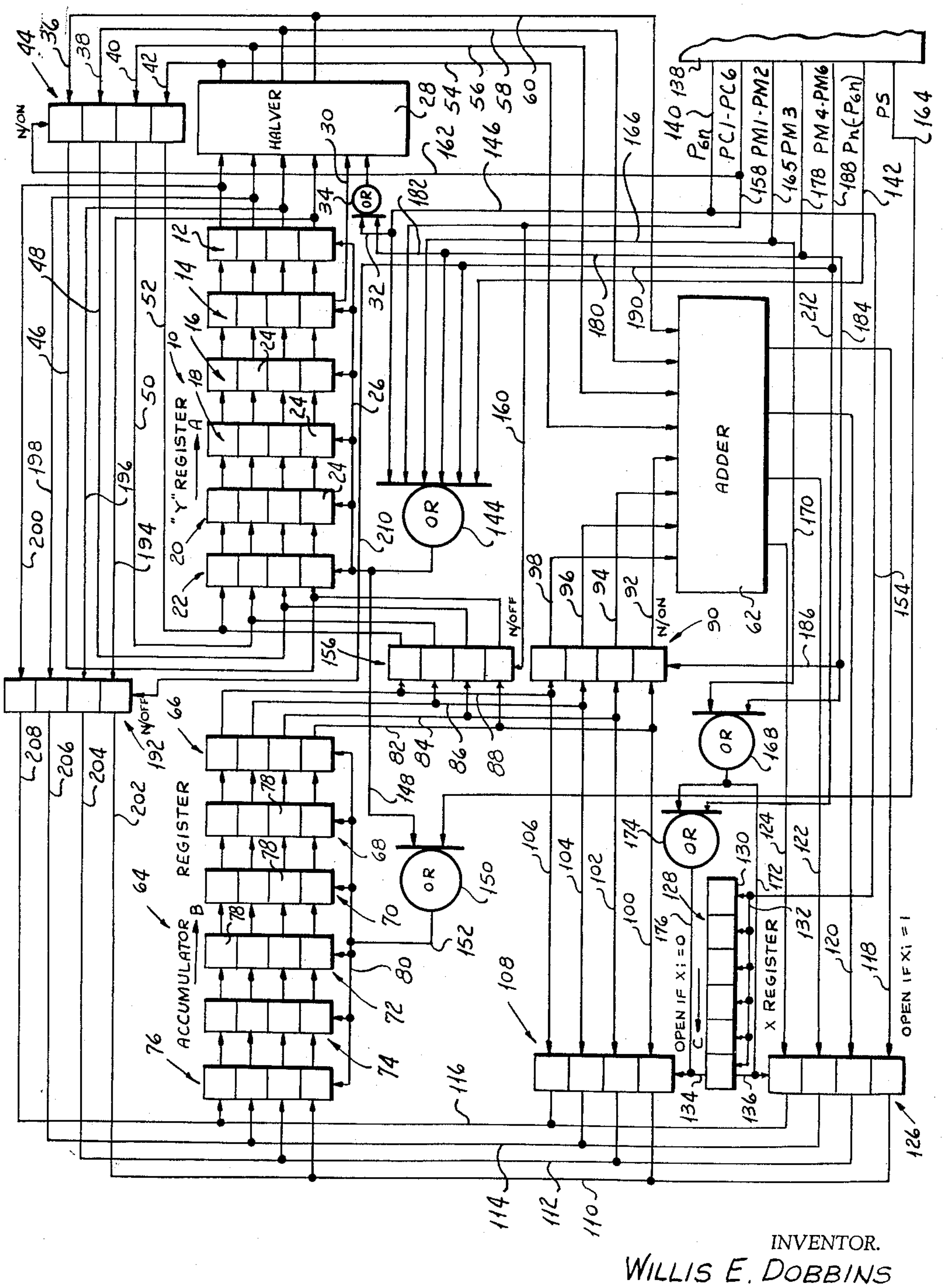
INVENTOR.
WILLIS E. DOBBINS
BY
Henry L. Shenier
ATTORNEY United States Patent Office 3,047,229
Patented July 31, 1962

3,047,229

APPARATUS FOR CONVERSION OF DEGREES TO MINUTES

Willis E. Dobbins, Manhattan Beach, Calif., assignor to United Aircraft Corporation, East Hartford, Conn., a corporation of Delaware Filed Nov. 21, 1958, Ser. No. 775,589
7 Claims. (Cl. 235—159)

My invention relates to apparatus for the conversion of degrees to minutes and more particularly to apparatus by means of which a fractional part of a revolution may be expressed in minutes or in degrees and minutes.

In automatic data collecting and processing systems, it is often necessary to determine the number of degrees in any given fraction of a revolution of a shaft or the like, the fractional revolution of which may be expressed as a binary number. The copending application of Myron J. Mendelson, Serial No. 724,413, filed March 27, 1958, now Patent No. 2,959,798, discloses an Apparatus for Performing Arithmetic Operations, which is capable of multiplying a binary fraction and a binary coded decimal number to produce a binary coded decimal product. By use of the apparatus disclosed in that application, it is possible to obtain a fractional part of a revolution expressed in degrees and a decimal part of a degree. While this result is generally satisfactory, in many instances it is desirable to obtain a result in terms of minutes or in terms of degrees and minutes. Such a result is not provided for by the apparatus disclosed in the copending application referred to hereinabove.

I have invented apparatus for converting degrees and decimal parts of a degree to minutes. When my apparatus is used with the apparatus of the copending application referred to hereinabove, it expresses a fractional part of a revolution in terms of degrees and minutes. If desired, my apparatus may be employed to convert minutes to seconds.

One object of my invention is to provide an apparatus for automatically converting degrees to minutes.

Another object of my invention is to provide an apparatus for converting degrees to minutes, which may be employed to express a fraction of a revolution directly in terms of degrees and minutes.

As is well-known, a number of degrees or a decimal part of a degree may be converted to minutes by multiplying by 60. The distributive law for multiplication tells us that if a given number is multiplied by one-half to produce a first number and is multiplied by one-tenth to give a second number and the two numbers are added, the same result is produced as if the number were multiplied by six-tenths. It will be appreciated that with suitable decimal point interpretation, this multiplication by sixth-tenths is the equivalent of a multiplication by sixty.

In general my invention contemplates the provision of apparatus for converting degrees to minutes including means for multiplying the number of degrees or decimal part of a degree by one-tenth to produce a first number. I provide my apparatus with means for multiplying the number of degrees or decimal part of a degree by one-half to produce a second number. My apparatus automatically adds the first and second numbers to produce a result, which with proper interpretation, represents the number of minutes included in the number of degrees or decimal part of a degree. My apparatus may be used with apparatus disclosed in the copending application referred to hereinabove to express a fraction of a revolution directly in terms of degrees and minutes.

In the accompanying drawing which forms part of the instant specification and which is to be read in conjunction therewith and in which like reference numerals are used to indicate like parts:

The FIGURE is a schematic view of my apparatus for converting degrees to minutes.

Referring now more particularly to the drawing, my apparatus for converting degrees to minutes includes a first input or "Y" shift register indicated generally by the reference character 10 adapted to receive a binary coded decimal number. Shifting registers of the nature of the register 10 are well known in the art. One type of shifting register which may be employed in my apparatus is shown and described on pages 144 to 148 of "Arithmetic Operations in Digital Computers" by R. K. Richards, published by D. Van Nostrand Co., Inc., New York (1955). The register 10 may, for example, be a six-place register including six respective banks indicated generally by the reference characters 12, 14, 16, 18, 20, and 22 of flip-flop circuits 24. As is known in the art, each circuit 24 is adapted to receive and store one binary bit of a representation of a digit of a decimal number. In response to a shift pulse, each circuit 24 passes the bit contained therein to the succeeding flip-flop in the direction of the arrow A in the figure. I have indicated the shift pulses for the register 10 as being carried by a channel 26 coupled to the respective banks or groups of flip-flop circuits. When the conductor 26 carries a shift pulse, the bits carried by the flip-flops of each bank shift from this bank to the flip-flop circuits of the bank to the right as viewed in the figure. For example, the bits in bank 14 shift to the bank 12 while the bits in the bank 16 shift to the bank 14, and so forth, throughout the register.

In order that a binary coded decimal number contained in the "Y" register be multiplied by a binary number, it is necessary, as in explained in the copending application referred to hereinabove, successively to halve the binary coded decimal number. In order to accomplish this result, I connect the output channels of the circuits 24 of bank 12 to a halver 28 of the type disclosed in the copending application. This halver successively divides the digits of a binary coded decimal number by two in a direction from the least significant to the most significant digit of the number, ignoring remainders. If the next most significant digit to that digit being operated upon is odd, five is added to half the digit being operated upon. If the next most significant digit to the digit being operated upon is even, nothing is added to the halved digit. It will be seen that for proper operation the halver requires not only the bits of the digit being operated upon but also the least significant bit of the digit following that digit being operated upon. A conductor 30 carries the least significant bit of the digit following the digit being operated upon to the halver. In addition, the halver must ignore the "oddness" or "evenness" of the digit, which apparently follows the most significant digit, in the direction of shift and must consider this digit to be even. A conductor 32, which as will be explained hereinafter, carries the last shift pulse of each group, feeds one input terminal of a two-input OR circuit 34, which supplies an input terminal of halver 28. The operation of halver 28 is more fully explained in the copending application referred to hereinabove. Each time the binary coded decimal number on the register 10 is cycled through the halver, it produces an output representing half the binary coded decimal number.

Respective channels 36, 38, 40, and 42 pass the output of the halver to the input terminals of a bank, indicated generally by the reference character 44 of normally "on" gating circuits. Respective chanels 46, 48, 50, and 52 connect the gating circuit 44 to the input terminals of the most significant group 22 of flip-flop circuits 24 of the register 10. From the structure thus far described, it will be aparent that in the course of each group of six shift pulses, the binary codded decimal number in the "Y" register 10 shifts through the halver 28 and passes back into the register 10 through the gating circuit 44. At the end of each cycle, the register 10 carries a representation of half the number represented on the register before the cycle began. Respective channels 54, 56, 58, and 60 carry the output of the halver 28 to four input terminals of an adder 62, which sequentially adds the digits of respective binary coded decimal numbers fed to its input terminals in a maner known to the art. One form of binary coded decimal adder suitable for use in my apparatus is shown and described on pages 242 and 243 of "Automatic Digital Computers" by Wilkes published by John Wiley and Sons, Inc., New York (1956).

My apparatus includes an accumulator register indicated generally by the reference character 64 similar to the accumulator register disclosed in the copending application referred to hereinabove. An example of one form of shifting register 64 is shown in the Richards publication referred to hereinabove. Register 64 may be, for example, a six-place register including groups or banks indicated generally by the respective reference characters 66, 68, 70, 72, 74, and 76 of flip-flop circuits 78. A shift pulse channel 80, connected to the respective banks of circuits 78, carries shift pulses which cause the register 64 to shift in the direction of the arrow B in the figure. In response to a shift pulse on chanel 80, the respective digits in banks 66, 68, 70, 72, 74, and 76 shift to the next bank in a direction from left to right as viewed in the figure.

Respective channels 82, 84, 86, and 88 carry the outputs of the circuits of bank 66 to the input terminals of a bank, indicated generally by the reference character 90, of normally "on" gating circuits, the output terminals of which are coupled to the adder by respective channels 92, 94, 96, and 98.

Respective channels 100, 102, 104, and 106 connect channels 82, 84, 86, and 88 to the input terimnals of a bank, indicated generally by the reference character 108, of gating circuits. Channels 110, 112, 114, and 116 couple the output terminals of the gating circuits of bank 108 to the input terminals of the circuits of bank 76 of register 64.

Respective channels 118, 120, 122, and 124 connect the adder output terminals to the input terminals of the bank, indicated generally by the reference character 126 of gating circuits, the output terminals of which are connected to channels 110, 112, 114, and 116.

My apparatus includes a binary number or "X" input register indicated generally by the reference character 128 made up of a number of circuits 130 adapted to receive and store the bits of a binary number. One form of register which may be used to perform the functions of the register 128 is shown in the Richards publication referred to hereinabove. In response to shift pulses carried by a channel 132 connected to the respective circuits 130, a binary number is shifted from circuit to circuit of the register 128 in the direction of the arrow C in the figure.

Respective channels 134 and 136 connect the circuit 130 in the most significant place of register 128 to the respective banks of gating circuits 108 and 126. The arrangement is such that if the bit in the most significant place in the register 128 is a "0" in the binary code, then the bank 108 of circuits passes signals while the circuits of the bank 126 do not permit passage of signals. On the other hand if the bit in the most significant place of the register 128 is a "1" in the binary code, the circuits of bank 126 pass signals while the circuits of bank 108 do not.

My apparatus includes a counter 138 having a first output channel 140, which carries every sixth pulse for the period of time during which the multiplication operation takes place to produce, for example, the fractional part of a revolution expressed in degrees and a fraction of a degree. A second output channel 142 of counter 138 carries all of the shift pulses except every sixth pulse required for the multiplication operation. The counter 138 or pulse generator may be of any suitable type known to the art and for this reason has not been shown in detail. One example of such a counter or pulse generator could be a commutator having a number of segments equal to the number of pulses to be produced and adapted to be sequentially connected to a source of potential. Appropriate connections can be made to the various segments in accordance with the showing of the figure. For purposes of convenience, I have designated the normal pulses required for multiplication as $P_n$ and have designated every sixth pulse as $P_{6n}$. In the figure I have designated channel 140 as $P_{6n}$, indicating that it carries only every sixth pulse, and I have designated channel 142 by the legend $P_{6n}$ $(-P_{6n})$, indicating that it carries all shift pulses except every sixth shift pulse. Since all the pulses $P_n$ and $P_{6n}$ are required to shift both the registers 10 and 64, I connect channel 140 to one input terminal of a six-input OR circuit 144 by means of a channel 146. I connect the channel 142 to another input terminal of OR circuit 144. I connect the output channel of circuit 144 to the shift channel 26 associated with register 10 and to channel 148 leading to one input of a two-input OR circuit 150, the output channel 152 of which is connected to the shift channel 80 associated with register 64. Since the binary register 128 must be shifted on every sixth pulse, I connect channel 140 to the binary register shift channel 132 by means of a channel 154.

With the structure thus far described a binary number contained in the register 128 may be multiplied by a binary coded decimal number in the register 10 to produce a binary coded decimal product in the register 64. This operation is in accordance with the disclosure of the copending application referred to hereinabove. The number contained in the "Y" register 10 is successively halved by halver 28 on successive cycles of operation. If the bit in the most significant circuit of the "X" register 128 is a "1," the halver output is added to the accumulator register output and passed back to the accumulator register through the bank 126 of gating circuits. If the bit in the most significant place in the register 128 is a "0," the accumulator register 64 merely recycles through the gating circuits of bank 108. When the register 128 has been emptied with the result that all "0's" appear on this register, the operation is complete and the accumulator register carries the desired binary coded decimal product.

After the binary coded decimal product representing, for example, a fraction of a revolution in terms of degrees and a fractional part of a degree has been obtained in the manner described hereinabove, my apparatus copies the result carried by the register 64 onto the register 10 while at the same time recycling the register 64 to the end that both registers carry the result. I connect a bank indicated generally by the reference character 156 of gating circuits between the output terminals of the circuits 78 of bank 66 of registers 64 and the input terminals of the circuits 24 of bank 22 of register 10. The counter 138 has a third channel 158 which carries the next six pulses following the pulses employed for the multiplication operation described hereinabove. A channel 160 connects the channel 158 carrying these next six pulses to the control input terminal of bank 156 of normally "off" gating circuits. These next six pulses, which for purposes of convenience I have designated as PC1 to PC6, cause the circuits of bank 156 to conduct. In order that these pulses PC1 to PC6 also step or shift the registers 10 and 64, I connect the channel 158 to another input terminal of circuit 144. In order that the result of the operation performed by halver 28 will not interfere with this copying operation, I connect channel 158 to a control input terminal of the group 44 of normally "on" gating circuits through a channel 162. It will be appreciated that since the register 128 at this point carries all "0's," the circuits of group 108 are enabled to permit the register 64 to recycle, and the circuits of group 126 are disabled with the result that the adder output does not affect the operation of the system.

When the copying operation has been completed by my apparatus, it next divides the number contained on the accumulator register 64 by ten. This is accomplished by shifting the accumulator register 64 one step to the right, as viewed in the figure. Another output terminal 164 of counter 138 carries the pulse PS following the last copying pulse PC6. My apparatus shifts register 64 one step to the right, as viewed in the figure, to divide the number contained therein by ten by applying pulse PS on channel 164 to OR circuit 150. It will be appreciated that as a result of this action only register 64 is shifted.

Let us assume that the decimal fraction part of the number on register 10 is contained in the three least significant banks 16, 14, and 12 of the register 10. Let us assume further that I wish to express the decimal part of the result in minutes to obtain an overall result in terms of degrees and minutes. To accomplish this result, my apparatus multiplies the decimal part of the number in register 10 by one-half and adds this result to the decimal fraction part of the number in register 64. It is to be noted that since the number in register 64 has been divided by ten and since I am working only with the decimal part of the original produce the only digits of interest in the decimal fraction part of the number contained therein are in banks 68 and 66. A channel 165 of counter 138 carries the first two pulses PM1 and PM2 of the cycle for converting the decimal part of the result to minutes. Since these two pulses must step both the registers 10 and 64, I apply the pulses to OR circuit 144 through a channel 166. Since for this part of the conversion cycle, half the two least significant digits in the register 10 is to be added to the least significant digits in banks 68 and 66, I apply these pulses also to an OR circuit 168 through a channel 170. I connect the output of OR circuit 168 to the channel 136 through a channel 172 and to one input terminal of an OR circuit 174, the output terminal of which is connected to channel 134 through a channel 176. As a result of these connections, during pulses PM1 and PM2 the gating circuits of bank 126 pass the output of the adder 62 to the accumulator register 64 while the gating circuits of bank 108 do not conduct.

Since the digit in the bank 70 of register 64 at the beginning of the converting cycle after the number in register 64 has been divided by ten is of no interest, it must be ignored. At the same time the digit which apparently is the next most significant digit to the digit in bank 16 of register 10 must be ignored and must be considered to be "0" since the only part of the number in the register 10 which is being halved is the fractional part of that number. A channel 178 of counter 138 carries the third shift pulse PM3 of the converting cycle which is to shift the digits originally contained in banks 16 and 70 out of the registers 10 and 64. A channel 180 connects channel 178 to OR circuit 144 to cause registers 10 and 64 to shift. A channel 182 connects channel 180 to the second input terminal of OR circuit 34 to cause the halver to ignore what appears to be the next most significant digit as the digit which originally was in bank 16 is shifted out of register 10 into the halver 28. A channel 184 couples pulse PM3 to the second input terminal of OR circuit 168 to cause the bank 126 of circuits to conduct and to render the circuits of bank 108 nonconductive for the duration of pulse PM3. As has been explained hereinabove since only the two least significant digits in register 64 have any meaning as the number in this register is divided by ten, the digit initially in bank 70 must be ignored. A channel 186 connects channel 184 to the control input terminal of the gating circuits of bank 90 to turn these normally "on" circuits "off." Thus the digit, which initially was in bank 70, is not passed to the adder and only the halved digit, which originally was in bank 16, passes through halver 28, through adder 62 and through the circuits of bank 126 to register 64 on the occurrence of pulse PM3.

Once the fractional portion of the result has been expressed in minutes in the manner described hereinabove to cause this result to appear on banks 76, 74, and 72 of register 64, my apparatus shifts the remaining digits of the result, which was copied onto register 10, from the register 10 onto the register 64. This operation takes place during the last three shift pulses PM4 to PM6 of the cycle for converting to minutes. These three pulses PM4 to PM6 appear on a channel 188, which is connected to an input terminal of OR circuit 144 by a channel 190 to cause registers 10 and 64 to shift. My apparatus includes a bank, indicated generally by the reference character 192, of normally "off" gating circuits. A first group of channels 194, 196, 198, and 200 connect the output terminals of the register 10 to the input terminals of the circuits of bank 192. A second group of channels 202, 204, 206, and 208 connect the output terminals of bank 192 to the input terminals of the register 64. A channel 210 couples the pulses PM4 to PM6 to the control input terminal of the bank 192 of normally "off" circuits to cause these circuits to pass the digits shifted out of the register 10 onto the register 64 during pulses PM4 to PM6. In order that the circuits of bank 108, which would be conductive since register 128 contains all "0's," do not permit digits shifted out of the register 64 to pass back to the register, I apply the pulses PM4 to PM6 to the other input terminal of OR circuit 174 through a channel 212. It will be remembered that since register 128 contains all "0's," the circuits of bank 126 are "off." After the last pulse PM6 of the conversion cycle, register 64 carries the result of a fractional part of a revolution expressed in degrees and minutes.

The operation of my apparatus for converting degrees and minutes can best be understood by considering a specific example. Let us assume that we wish to express $^{33}\!/_{64}$ of a revolution in terms of degrees and minutes. To accomplish this, I first place the binary coded decimal number 360.000 on register 10 and place the binary fraction $^{33}\!/_{64}$=.100001 on register 128. I next cycle the system through six cycles, employing every sixth pulse to shift the register 128 in the manner disclosed in the copending application referred to hereinabove. At the end of this operation, register 64 carries the result expressed in degrees and a fraction of a degree as 185.625°. My apparatus copies this result onto the register 10 during the cycle of pulses PC1 to PC6. I next shift accumulator register through one step by means of pulse PS. Following this operation my apparatus converts the fractional part of the result into minutes during the conversion cycle of pulses PM1 to PM6. For purposes of clarity, I have set forth in Table 1 below the steps through which the registers of my apparatus pass in the course of a complete operation after the accumulator has been cleared to all zeros.

*Table I*

| Pulse | X Register (128) | Y Register (10) | A Register (64) | Gating Circuit Banks | | | | | |
|---|---|---|---|---|---|---|---|---|---|
| | | | | 108 | 126 | 156 | 44 | 90 | 192 |
| P1 | 100001 | 360000 | 000000 | off | on | off | on | on | off |
| P1 | 100001 | 036000 | 000000 | off | on | off | on | on | off |
| P2 | 100001 | 003600 | 000000 | off | on | off | on | on | off |
| P3 | 100001 | 000360 | 000000 | off | on | off | on | on | off |
| P4 | 100001 | 000036 | 000000 | off | on | off | on | on | off |
| P5 | 100001 | 800003 | 800000 | off | on | off | on | on | off |
| P6 | 000010 | 180000 | 180000 | on | off | off | on | on | off |
| P7 | 000010 | 018000 | 018000 | on | off | off | on | on | off |
| P8 | 000010 | 001800 | 001800 | on | off | off | on | on | off |
| P9 | 000010 | 000180 | 000180 | on | off | off | on | on | off |
| P10 | 000010 | 000018 | 000018 | on | off | off | on | on | off |
| P11 | 000010 | 900001 | 800001 | on | off | off | on | on | off |
| P12 | 000100 | 090000 | 180000 | on | off | off | on | on | off |
| P13 | 000100 | 009000 | 018000 | on | off | off | on | on | off |
| P14 | 000100 | 000900 | 001800 | on | off | off | on | on | off |
| P15 | 000100 | 000090 | 000180 | on | off | off | on | on | off |
| P16 | 000100 | 500009 | 000018 | on | off | off | on | on | off |
| P17 | 000100 | 450000 | 800001 | on | off | off | on | on | off |
| P18 | 001000 | 045000 | 180000 | on | off | off | on | on | off |
| P19 | 001000 | 004500 | 018000 | on | off | off | on | on | off |
| P20 | 001000 | 000450 | 001800 | on | off | off | on | on | off |
| P21 | 001000 | 500045 | 000180 | on | off | off | on | on | off |
| P22 | 001000 | 250004 | 000018 | on | off | off | on | on | off |
| P23 | 001000 | 225000 | 800001 | on | off | off | on | on | off |
| P24 | 010000 | 022500 | 180000 | on | off | off | on | on | off |
| P25 | 010000 | 002250 | 018000 | on | off | off | on | on | off |
| P26 | 010000 | 500225 | 001800 | on | off | off | on | on | off |
| P27 | 010000 | 250022 | 000180 | on | off | off | on | on | off |
| P28 | 010000 | 125002 | 000018 | on | off | off | on | on | off |
| P29 | 010000 | 112500 | 800001 | on | off | off | on | on | off |
| P30 | 100000 | 011250 | 180000 | off | on | off | on | on | off |
| P31 | 100000 | 501125 | 518000 | off | on | off | on | on | off |
| P32 | 100000 | 250112 | 251800 | off | on | off | on | on | off |
| P33 | 100000 | 625011 | 625180 | off | on | off | on | on | off |
| P34 | 100000 | 562501 | 562518 | off | on | off | on | on | off |
| P35 | 100000 | 056250 | 856251 | off | on | off | on | on | off |
| P36 | 000000 | 005625 | 185625 | on | off | off | on | on | off |
| PC1 | 000000 | 500562 | 518562 | on | off | on | off | on | off |
| PC2 | 000000 | 250056 | 251856 | on | off | on | off | on | off |
| PC3 | 000000 | 625005 | 625185 | on | off | on | off | on | off |
| PC4 | 000000 | 562500 | 562518 | on | off | on | off | on | off |
| PC5 | 000000 | 856250 | 856251 | on | off | on | off | on | off |
| PC6 | 000000 | 185625 | 185625 | on | off | on | off | on | off |
| PS | 000000 | 185625 | 518562 | on | off | off | on | on | off |
| PM1 | 000000 | 218562 | 451856 | off | on | off | on | on | off |
| PM2 | 000000 | 121856 | 745185 | off | on | off | on | on | off |
| PM3 | 000000 | 812185 | 374518 | off | on | off | on | off | off |
| PM4 | 000000 | 281218 | 537451 | off | off | off | on | on | on |
| PM5 | 000000 | 928121 | 853745 | off | off | off | on | on | on |
| PM6 | 000000 | 092812 | 185374 | off | off | off | on | on | on |

From Table I above it will be seen that at the end of the conversion cycle, register 64 carries $33/64$ of a revolution expressed in degrees and minutes as 185°37.4′. This result includes a negligible error of a tenth of a minute owing to the fact that one place was lost when register 64 shifted to the right to divide the number contained therein by ten.

While I have explained the operation of my apparatus in connection with a complete operation of determining a fraction of a revolution in degrees and minutes, it will readily be appreciated that my apparatus can convert degrees or decimal parts of a degree entirely to minutes. This is readily accomplished by placing the number of degrees or decimal parts of a degree on the registers 64 and 10. When this has been done, register 64 shifts to the right one place to divide the number contained therein by 10. My apparatus then cycles both registers to divide the number in the register 10 by half and to add this result to the number shifted out of the register 64 to cause the result converted to minutes to appear on the accumulator register.

It is to be understood further that my apparatus may be employed to convert minutes or decimal parts of a minute to seconds. For example, if it is desired to express a result in terms of degrees, minutes, and seconds, the decimal part of a degree is first converted to minutes in the manner described above to produce a result including the decimal part of a minute. This decimal part of a minute may be converted to seconds by dividing it by ten and by adding this number to half the decimal part of a minute in the same manner as was done for the decimal part of a degree.

It will be seen that I have accomplished the objects of my invention. I have provided apparatus for converting degrees and decimal parts of a degree to minutes. My apparatus is capable of producing the fractional part of a revolution directly in terms of degrees and minutes.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for multiplying a number by six-tenths including in combination means comprising a first register having weighted positions of significance from most significant to least significant for receiving and storing a binary-coded decimal representation of the number in said positions of significance, means comprising a second register for receiving and storing the binary-coded decimal representation of the number, means for shifting the representation of the first register one decimal place in a direction from the most significant weighted position of the register to the least significant weighted position of the register, means for halving the representation of the second register, and means for adding the shifted first register representation and the halved second register representation.

2. Apparatus for multiplying a number by six-tenths including in combination means comprising a first register having weighted positions of significance from most significant to least significant for receiving and storing a binary-coded decimal representation of the number in said positions of significance, means comprising a second register for receiving and storing the binary-coded decimal representation of the number, a halver, an adder, means for coupling the second register to the halver, means for shifting the representation of the first register one decimal place in a direction from the most significant weighted position of the register to the least significant weighted position of the register, means for coupling the halver to the adder, and means for coupling the shifted first register representation to the adder.

3. Apparatus for multiplying as in claim 2 including means for coupling the adder to one of the first and second registers.

4. Apparatus for converting a number expressed in degrees and a decimal fraction of a degree into degrees and minutes including in combination means comprising a first register having weighted positions of significance from most significant to least significant for receiving and storing a binary-coded decimal representation of the number, means comprising a second register having weighted positions of significance from most significant to least significant for receiving and storing the binary-coded decimal representation of the number in said positions of significance, a halver, an adder, first means for successively shifting the representation of the first register one decimal place in a direction from the most significant weighted position of the register to the least significant weighted position of the register, second means for successively shifting the representation of the second register one decimal place in a direction from the most significant weighted position of the register to the least significant weighted position of the register, means for coupling the second register to the halver, means for coupling the halver to the adder, means for coupling the first register to the adder, means for coupling the adder to a certain one of the first and second registers, means for coupling the second register to said certain register, means for generating a first and a second pulse, means for coupling the first pulse to the first shifting means, and means for coupling the second pulse to the second shifting means.

5. Apparatus for converting as in claim 4 including means for coupling the second pulse to the halver.

6. Apparatus for converting a number expresesd in degrees and a decimal fraction of a degree into degrees and minutes including in combination means comprising a first register having weighted positions of significance from most significant to least significant for receiving and storing a binary-coded decimal representation of the number in said positions of significance, means comprising a second register having weighted positions of significance from most significant to least significant for receiving and storing the binary-coded decimal representation of the number in said positions of significance, a halver, an adder, first means for successively shifting the representation of the first register one decimal place in a direction from the most significant weighted position of the register to the least significant weighted position of the register, second means for successively shifting the representation of the second register one decimal place in a direction from the most significant weighted position of the register to the least significant weighted position of the register, means for coupling the second register to the halver, means for coupling the halver to the adder, means for coupling the first register to the adder, first normally disabled means adapted to be enabled for coupling the adder to a certain one of the first and second normally disabled registers, second means adapted to be enabled for coupling the second register to said certain register, means for generating a first pulse and a second pulse and a third pulse and a fourth pulse, means for coupling the first pulse to the first shifting means, means for coupling the second pulse to the first shifting means and to the second shifting means, means for coupling the third pulse both to the halver and to the second shifting means, means for coupling the fourth pulse to the second shifting means, means responsive to the second pulse and to the third pulse for enabling the first coupling means, and means responsive to the fourth pulse for enabling the second coupling means.

7. Apparatus for converting a portion of a unit of angular measurement into degrees and minutes including in combination means comprising a first binary-coded decimal register for storing a decimal representation in degrees of said unit, means comprising a second binary code register for storing a binary representation of said portion, a third binary-coded decimal register, a halver, means for coupling the first register to the halver, means responsive to the halver and to the second register for producing in the third register a decimal representation in degrees of said portion of said unit, means for reproducing the third register representation in the first register, means for shifting the third register representation one decimal place, and means responsive to the shifted third register representation and to the halver for producing in one of the first and third registers a representation in degrees and minutes of said portion of said unit of angular measurement.

References Cited in the file of this patent

UNITED STATES PATENTS 2,745,599 Woods-Hill et al. ______ May 15, 1956

OTHER REFERENCES

Harvard: Synthesis of Electronic Computing and Control Circuits, Harvard University Press, 1951, pp. 199, 200, and 221 are relied on.